United States Patent [19]

Reed

[11] Patent Number: 5,513,501
[45] Date of Patent: May 7, 1996

[54] FREEZER

[76] Inventor: Claude A. Reed, 4810 S. 136th St., Omaha, Nebr. 68137

[21] Appl. No.: 344,168

[22] Filed: Nov. 23, 1994

[51] Int. Cl.⁶ ..................................... F25D 25/04
[52] U.S. Cl. ..................... 62/381; 198/377; 198/345.1; 312/267
[58] Field of Search .................... 312/266–268; 198/345.1, 377, 378, 475.1, 802; 62/378, 380, 381

[56] References Cited

U.S. PATENT DOCUMENTS

| | | | |
|---|---|---|---|
| 2,112,015 | 3/1938 | Crisman | 312/267 X |
| 2,592,038 | 4/1952 | Kimsey | 312/267 X |
| 2,923,136 | 2/1960 | Tiede | 312/267 X |
| 2,950,605 | 8/1960 | Hennion | 312/268 X |
| 2,976,099 | 3/1961 | Morrison | 312/267 |

*Primary Examiner*—William E. Tapolcai
*Attorney, Agent, or Firm*—Zarley, McKee, Thomte, Voorhees & Sease; Mark D. Frederiksen

[57] ABSTRACT

A freezer includes an enclosed housing with cooling apparatus and a rotatable drive wheel mounted on one side wall within the housing. A plurality of support members are mounted on the drive wheel for rotation therewith. Food containers are selectively mounted to the support members to rotate with the drive wheel within the freezer housing. An operable door in the front panel of the housing provides access to the food containers, and a switch disengages the rotation of the drive wheel so as to permit dispensing of food product from a container.

5 Claims, 5 Drawing Sheets

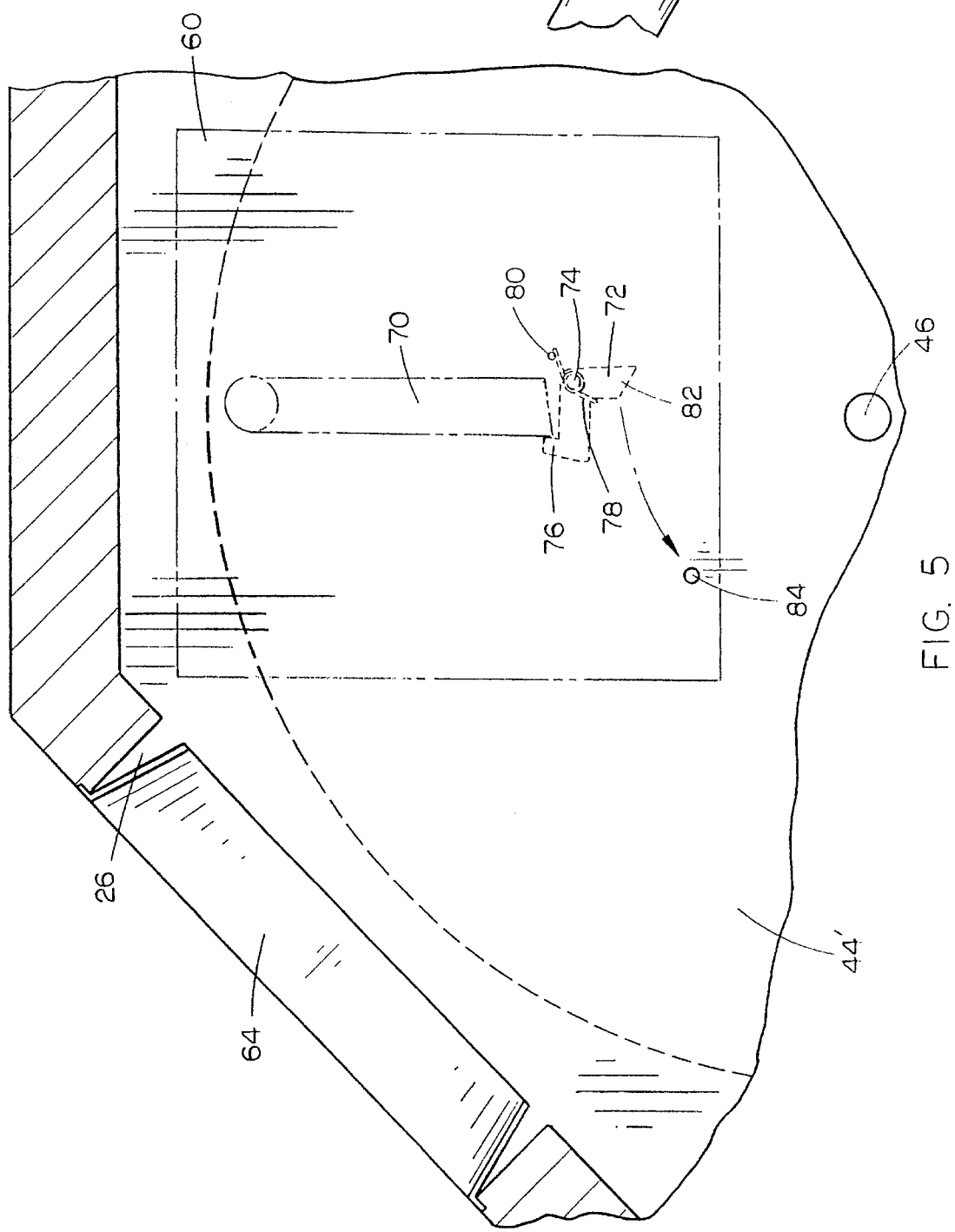
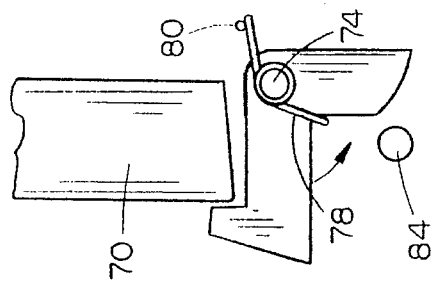
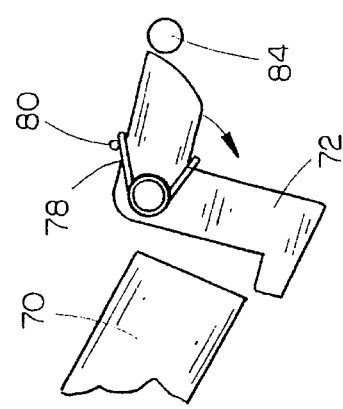
FIG. 5
FIG. 6A
FIG. 6B

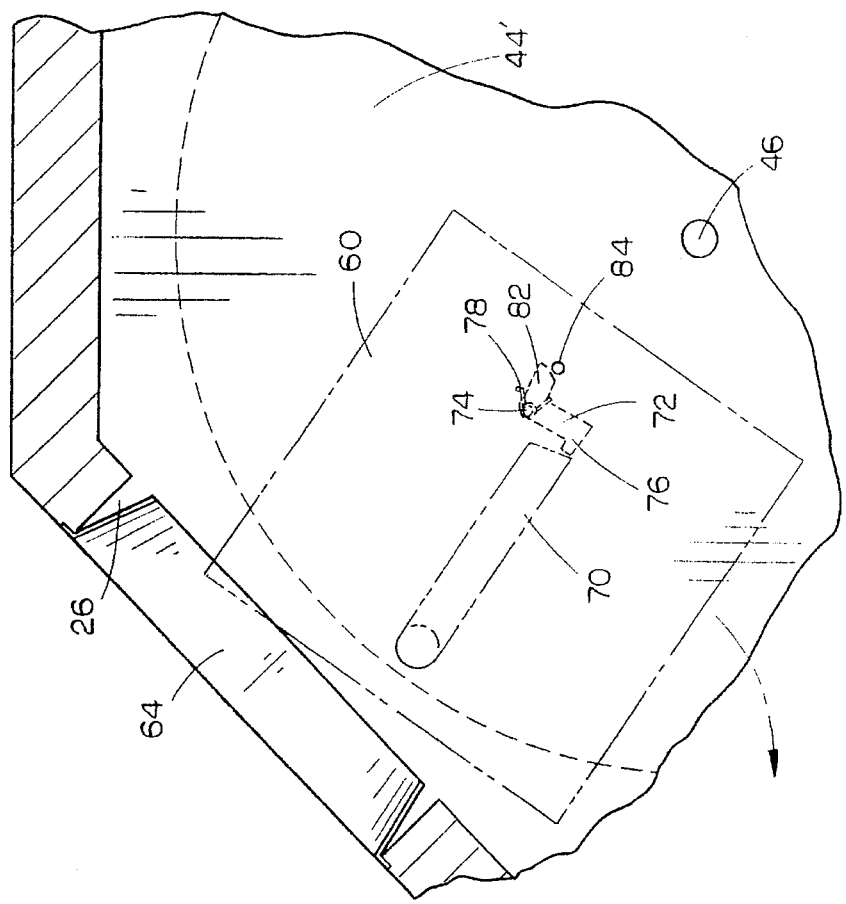
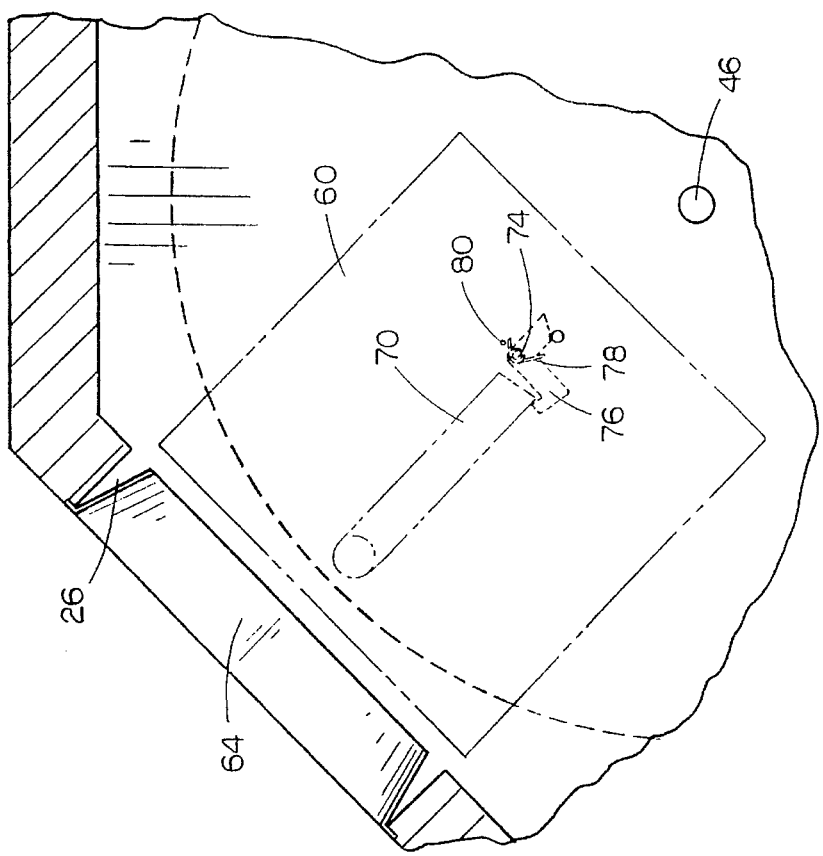

FREEZER

TECHNICAL FIELD

The present invention relates generally to freezers for storage of frozen food, and more particularly to an improved dispenser which will maintain frozen foods at a relatively constant temperature while permitting frequent dispensing of items from the unit.

BACKGROUND OF THE INVENTION

Hand-dipped ice cream has been a favorite frozen food product throughout this country for many years. Typically, ice cream parlors will store three-gallon tubs of ice cream within a freezer unit, with the tubs open on top to permit dipping of the ice cream. While such freezers permit easy access to a wide variety of ice cream containers, there are several problems with the conventional freezer arrangement.

Typical ice cream freezer cabinets contain a plurality of three gallon ice cream tubs arranged horizontally within a generally rectangular cabinet, with every ice cream container supported on the bottom of the cabinet, such that all of the different flavors may be viewed from above. Typically, the conventional cabinet locates the lower end of each ice cream container about eight inches above floor level. While such an arrangement exposes all of the varieties of ice cream flavors to visual inspection, an individual must lean over and down into the freezer in order to dip the ice cream. The position required to scoop the ice cream is awkward, can strain the back muscles, and must be repeated frequently.

In order to reduce injuries, it is typical for these standard ice cream cabinets to be set with a bottom temperature which is warm enough to permit ease of scooping at the lower end of the container. However, this causes the top and middle of the container to be at a temperature which is too warm, creating a great yield loss of ice cream. When the ice cream is stored at a temperature which is too warm, the ice cream loses air cell retention, and thus loses volume. In a conventional cabinet, set with the bottom temperature to permit easy scooping, it is not uncommon to have a loss of 20%–30% of each bulk can of ice cream, or approximately 5–7 pints of a three gallon bulk can.

If the temperature at the bottom of the ice cream container is maintained at a level is which permits ease of scooping, then the upper level temperature of surrounding containers is too warm, and the ice cream becomes too soft to maintain its shape. Because the ice cream is typically accessed by raising the entire cabinet lid, all of the ice cream containers are exposed to warm air when one flavor in the cabinet is dipped.

Another problem with conventional ice cream freezer arrangements is the position required to scope the ice cream. In most cases, the individual must lean over and down into the freezer to dip the ice cream. Such a position can strain the back, and therefore cause injuries to workers.

Finally, conventional ice cream freezers take a large amount of floor space to maintain a variety of ice cream flavors adjacent one another and accessible for dipping.

SUMMARY OF THE INVENTION

It is therefore a general object of the present invention to provide an improved ice cream freezer and dispenser which maintains a generally constant temperature of the food product to be dispensed.

Yet another object is to provide a frozen food product dispenser which provides access to a variety of products within a smaller floor space as compared to conventional freezer units.

Still another object of the present invention is to provide an ice cream freezer which maintains a plurality of individual ice cream containers at a constant temperature appropriate for scooping of the ice cream throughout the container.

Yet another object is to provide a frozen food product freezer and dispenser which is economical to manufacture, simple to utilize, and refined in appearance.

These and other objects of the present invention will be apparent to those skilled in the art.

The freezer of the present invention includes an enclosed housing with cooling apparatus and a rotatable drive wheel mounted on one side wall within the housing. A plurality of support members are mounted on the drive wheel for rotation therewith. Food containers are selectively mounted to the support members to rotate with the drive wheel within the freezer housing. An operable door in the front panel of the housing provides access to the food containers, and a switch disengages the rotation of the drive wheel so as to permit dispensing of food product from a container.

BRIEF DESCRIPTION OF THE DRAWINGS

FIG. 5 is an enlarged elevational view of a portion of the drive wheel shown in FIG. 3;

FIG. 6A is an enlarged view of a latch for one container support in an engaged position;

FIG. 6B is a view similar to 6A, but with the latch moved to a disengaged position;

FIG. 7A is a view similar to FIG. 5, but with one container moved to a dispensing position; and FIG. 7B is a view similar to FIG. 7A, but with the container disengaged from the latch mechanism.

DESCRIPTION OF THE PREFERRED EMBODIMENT

Figure 1:
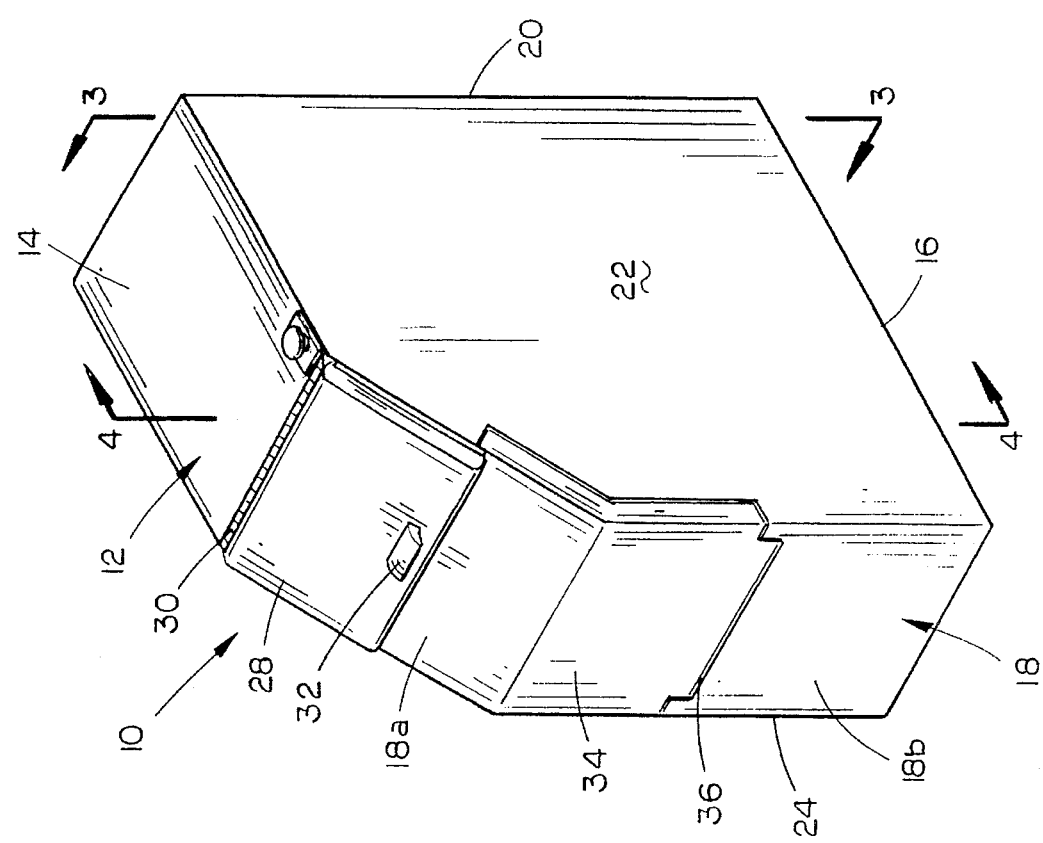
FIG. 1 is a perspective view of the frozen food freezer and dispenser of the present invention.

Referring now to the drawings, in which similar or corresponding parts are identified with the same reference numeral, and more particularly to FIG. 1, the freezer of the present invention is identified generally at 10 and includes a housing 12 having a top 14, bottom 16, front panel 18, rear panel 20 and opposing side panels 22 and 24, Preferably, housing 12 has a slanted upper front corner such that front panel 18 includes an upper slanted portion 18a and a lower generally vertical portion 18b.

Figure 2:
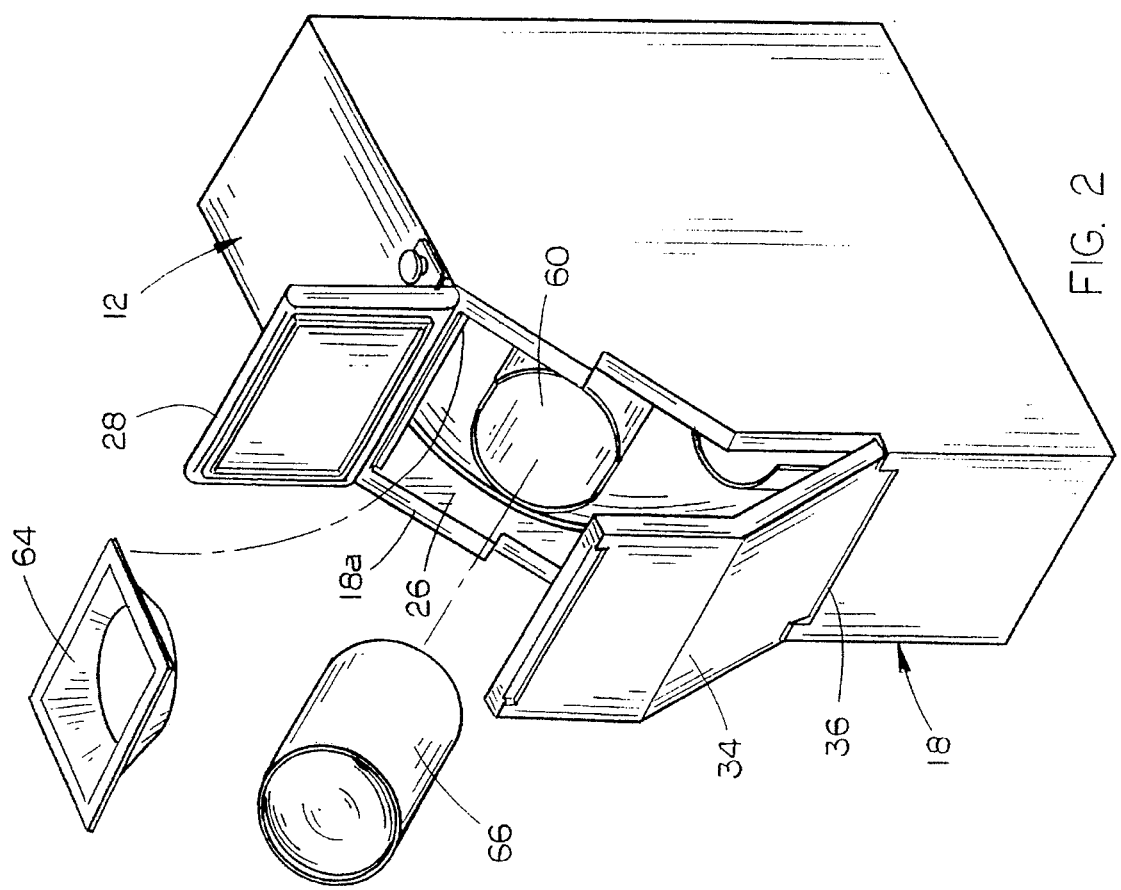
FIG. 2 is a perspective view of the invention with a forward panel opened to show the interior thereof.

As shown in FIG. 2, the upper portion 18a of front panel 18 includes a generally rectangular opening 26 therein through which an individual may access the interior of housing 12 to reach the food products therein. Opening 26 is selectively covered by a door 28 having a hinge 30 (see FIG. 1) along its upper edge to permit the door 28 to be pivoted upwardly to an open position, as shown in FIG. 2. A handle 32 on door 28 permits easy operation of the door.

An access panel 34 is formed in front panel 18 and is hinged along its bottom edge, so as to pivot away from housing 12 about hinge 36. Access panel 34 permits an expanded opening to provide greater access to the interior of housing 12.

Figure 3:
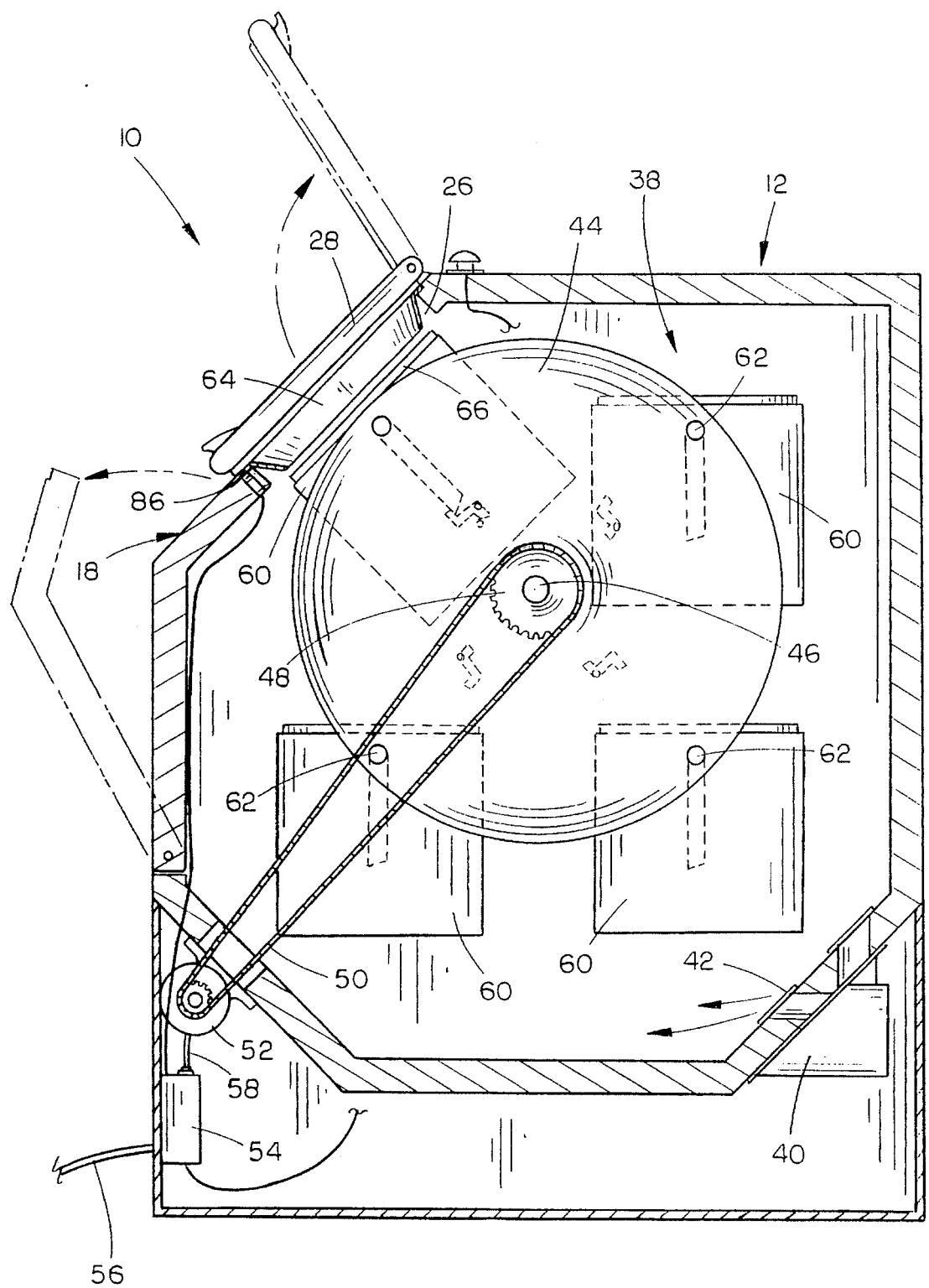
FIG. 3 is a sectional view taken at lines 3—3 in FIG. 1.

Referring now to FIG. 3, the interior of housing 12 includes a refrigerated chamber 38 therein with a conventional frost-free evaporator 40 directing cooled air into chamber 38 through vents 42. Obviously, other methods of cooling the interior of chamber 38, such as coolant coils, may be utilized.

A generally disk-shaped drive wheel 44 is mounted on a drive axle 46 for rotation about the rotational axis of axle 46. A gear 48 on axle 46 engages a chain 50 extending from gear 48 to a drive motor 52 mounted exteriorly of refrigerated chamber 38. A control box 54 mounted in housing 12 has an electrical cable 56 connected to a source of power, and a pair of conductors 58 supplying power to drive motor 52. As discussed in more detail hereinbelow, control box 54 is preferably programmed to provide power intermittently to motor 52.

Figure 4:
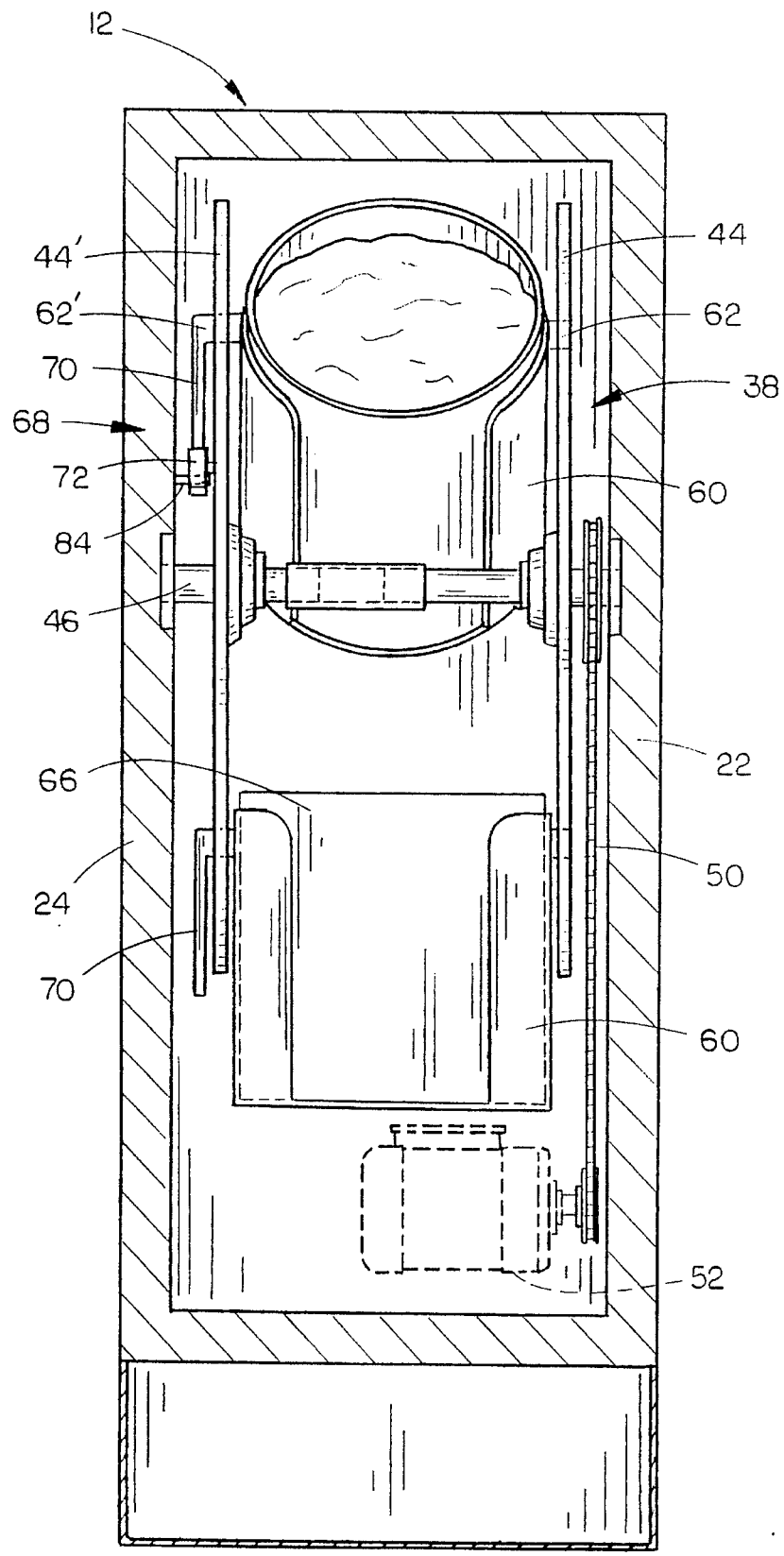
FIG. 4 is a sectional view taken at lines 4—4 in FIG. 1.

As shown in FIG. 4, a second disk-shaped drive wheel 44' is also mounted on axle 46 and spaced from drive wheel 44. Axle 46 is rotatably mounted between side panels 22 and 24, and is disposed generally horizontally within chamber 38. FIG. 3 shows a plurality of ice cream container support members 60 pivotally mounted between drive wheels 44 and 44' on diametrically opposed pins 62 and 62', in a fashion similar to a Ferris wheel. Thus, as drive wheels 44 and 44' rotate on axle 46, support members 60 will maintain a generally upright position as they pivot on pins 62 and 62'.

Referring once again to FIGS. 2 and 3, a plastic insert 64 is provided in opening 26 to narrow and change the shape of opening 26, to conform to the shape of the ice cream container 66 supported in support member 60. Insert 64 also assists in preventing entry of exterior air into refrigerated chamber 38 when door 28 is in the open position.

The best position for dipping ice cream is with the ice cream container 66 tilted at an angle of approximately 45° F. For this reason, the inventor has provided a mechanism for tilting each support member 60 as it approaches the opening 26. This tilt mechanism will align the ice cream container with insert 64 as drive wheels 44 and 44' rotate each support member 60 towards opening 26.

Referring to FIGS. 4, 5, 6A and 6B, each tilt mechanism 68 includes an arm 70 depending from pin 62' between side panel 24 and drive wheel 44', so as to rotate with pin 62' and support member 60. Thus, as each support 60 is moved by drive wheels 44 and 44', depending arm 70 will remain in a generally vertical orientation. FIG. 5 shows is an operable latch 72 pivotally mounted on a pin 74 on the exterior of drive wheel 44'. Latch 72 has a hook arm 76 positioned to engage the lower end of arm 70 as drive wheel 44 rotates to position support member 60 adjacent opening 26 and insert 64. A spring 78 is journaled on pin 74 and has one leg engaging hook arm 76, and a second leg engaging a peg 80 projecting from drive wheel 44'. Spring 78 biases latch hook arm 76 to an engaged position with arm 70 to prevent the rotation of arm 70 as support member 60 moves towards insert 64. Thus, support member 60 will be caused to tilt as arm 70 is maintained in a position oriented radially relative to axle 46, as shown in FIG. 7a.

As support member 60 is rotated past the access position of FIG. 7A, a depending leg 82 of latch 72 contacts a projection 84 projecting from side panel 24 of housing 12. As shown in FIGS. 6B and 7B, projection 84 is located in the path of latch depending leg 82, causing latch 72 to pivot about pin 74 against the bias of spring 78. This pivotal movement of latch 72 disengages hook arm 76 from arm 70, permitting arm 70 and support member 60 to swing freely down to a vertical position. As drive wheel 44' continues to rotate, latch 72 will move beyond projection 84, and spring 78 will bias latch 72 back to its original position.

In operation, the consumer loads ice cream containers into support members 60 by opening front panel 34, as shown in FIGS. 1 and 2. Ice cream containers 66 are inserted within individual support members 60 as shown in FIG. 2, and then front panel 34 is closed. A contact switch 86 is mounted on front panel 18 in a position such that the closing of door 28 will close switch 86. A conductor 88 leads to control box 54 so as to then engage the drive motor 52 to rotate drive wheels 44 and 44'. Preferably, motor 52 is operated intermittently, at a speed of approximately 15 revolutions per minute. A standard electrical timer within control box 54 will provide a continuously repeated cycle of one second of power and 59 seconds with the power off. Thus, energy use is dramatically reduced in operating the drive wheels. During a 24-hour time period, only 36 minutes of power are required to rotate the drive wheels. At the same time, each support member 60 will rotate through warmer air at the upper end of chamber 38 and cooler air at the lower end of the chamber, so as to expose the ice cream containers to an equal amount of time in each temperature zone within chamber 38.

Preferably, the lower end of chamber 38 is maintained at a temperature of about 0° F. As door 28 is opened, permitting a small amount of warm air to enter chamber 38, the temperature at the upper end of chamber 38 is typically about 16° F. Without the intermittent rotation of drive wheels 44 and 44', that portion of the ice cream located at the upper end of the chamber 38 would be too warm, while ice cream located at the lower end of chamber 38 would be too cold. In fact, there was only about a 3° F. range of temperature where the consistency of the ice cream is just right for scooping. This preferred ranged is approximately 8°–10° F.

It can be seen that as drive wheels 44 and 44' are rotated, as shown in FIG. 3, the ice cream containers will continuously pass through the range of temperatures from 0°–16° F., thereby maintaining a constant temperature within the desired range. In addition, the movement of support members 60 and the ice cream containers within the compartment will help to circulate the air within the compartment, thereby reducing the temperature differential between the upper and lower ends of the chamber 38.

Because the ice cream is positioned within the cabinet at a higher level for scooping, an individual can apply more pressure and leverage to dip the ice cream without straining the individual's wrist or back. Because of this reduction in strain, the individual can scoop harder, colder ice cream. Maintaining harder, colder ice cream reduces the yield loss, described above. In fact, the inventor estimates that yield loss can be reduced by 70%–90% simply by the repositioning of the containers at this higher level, permitting a lower ice cream temperature.

Whereas the invention has been shown and described in connection with the preferred embodiments thereof, it will be understood that many modifications, substitutions, and additions may be made which are within the intended broad scope of the appended claims. There has therefore been shown and described an improved freezer which accomplishes at least all of the above stated objects.

I claim:

1. A freezer, comprising:

an enclosed housing having a top, bottom, front panel, rear panel and opposing side panels;

a refrigerated chamber formed within said housing;

an operable door in said housing, operable between open and closed positions, permitting access to said chamber through an access opening when in the open position;

said front panel including an upper portion angled rearwardly to form a beveled corner in said housing, said operable door located in said angled upper portion to provide access to a container supported on one of said individual support members;

selectively operable means for supporting food products within said chamber, said support means operable to reciprocate food products within the chamber between upper and lower positions therein;

said support means including a plurality of individual support members operably mounted to reciprocate between upper and lower positions within said chamber;

said support means further including:
a drive wheel rotatably mounted on an axle between the side walls for rotation about the axle;
said individual support members connected to said drive wheel for rotational movement around said axle;
each said individual support member being pivotally mounted to said drive wheel, to maintain a generally upright orientation as the drive wheel rotates on said axle; and
means for selectively rotating said drive wheel;

said means for selectively rotating said drive wheel including an electrically powered motor;

an electrical control unit electrically connected to said motor for selectively activating said motor to rotate the drive wheel;

a first switch operably mounted on said housing and electrically connected to said control unit, operable to selectively activate said motor to rotate the drive wheel and position a selected individual support member in a dispensing position adjacent said operable door;

a tilt mechanism operably connected to each individual support member to tilt each support member to an angle wherein a cylindrical container supported on each support member is oriented generally perpendicularly to said angled upper portion of said front panel when each support member is rotated to the dispensing position.

2. The freezer of claim 1, further comprising means for releasing each support member from the tilted position in response to movement of the support member past the dispensing position.

3. The freezer of claim 1, further comprising a plurality of generally cylindrical containers with a food product therein, one container positioned in each individual support member, said containers having an open upper end for accessing the food product therein.

4. The freezer of claim 3, further comprising an insert mounted in said access opening having an exterior edge mounted continuously along the access opening and a circular central opening therein having a diameter substantially the same as said containers.

5. A freezer, comprising:

an enclosed housing having a top, bottom, front panel, rear panel and opposing side panels;

a refrigerated chamber formed within said housing;

an operable door in said housing, operable between open and closed positions, permitting access to said chamber through an access opening when in the open position;

said front panel including an upper portion angled rearwardly to form a beveled corner in said housing, said operable door located in said angled upper portion to provide access to a container supported on one of said individual support members;

selectively operable means for supporting food products within said chamber, said support means operable to reciprocate food products within the chamber between upper and lower positions therein;

said support means including a plurality of individual support members operably mounted to reciprocate between upper and lower positions within said chamber;

said support means further including:
a drive wheel rotatably mounted on an axle between the side walls for rotation about the axle;
said individual support members connected to said drive wheel for rotational movement around said axle;
each said individual support member being pivotally mounted to said drive wheel, to maintain a generally upright orientation as the drive wheel rotates on said axle; and
means for selectively rotating said drive wheel;

said means for selectively rotating said drive wheel including an electrically powered motor;

an electrical control unit electrically connected to said motor for selectively activating said motor to rotate the drive wheel; and a operable electrical switch positioned such that movement of the door to the open position opens the switch and movement of the door to the closed position closes the switch, said switch electrically connected to said control unit to permit operation of the motor when the switch is in the closed position.

* * * * *